United States Patent
Kim et al.

(10) Patent No.: US 9,113,285 B2
(45) Date of Patent: Aug. 18, 2015

(54) METHOD FOR TRANSMITTING/RECEIVING CONTROL INFORMATION FOR AN M2M DEVICE, AND DEVICE FOR SAME

(75) Inventors: Jeongki Kim, Anyang-si (KR); Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

(21) Appl. No.: 14/003,055

(22) PCT Filed: Mar. 8, 2012

(86) PCT No.: PCT/KR2012/001698
§ 371 (c)(1),
(2), (4) Date: Sep. 4, 2013

(87) PCT Pub. No.: WO2012/121552
PCT Pub. Date: Sep. 13, 2012

(65) Prior Publication Data
US 2013/0336278 A1    Dec. 19, 2013

Related U.S. Application Data

(60) Provisional application No. 61/450,562, filed on Mar. 8, 2011.

(51) Int. Cl.
H04W 4/00      (2009.01)
H04H 20/71     (2008.01)
H04W 72/04     (2009.01)

(52) U.S. Cl.
CPC ............ *H04W 4/005* (2013.01); *H04W 72/042* (2013.01)

(58) Field of Classification Search
CPC ... H04W 74/006; H04W 48/12; H04W 4/005; H04W 48/08; H04W 4/08
See application file for complete search history.

(56) References Cited

U.S. PATENT DOCUMENTS

| | | |
|---|---|---|
| 2010/0316007 A1* | 12/2010 | Son et al. ............... 370/329 |
| 2011/0255499 A1* | 10/2011 | Kim et al. .............. 370/329 |
| 2012/0026965 A1* | 2/2012  | Cho et al. .............. 370/329 |
| 2012/0039288 A1* | 2/2012  | Kim et al. .............. 370/329 |
| 2012/0113947 A1* | 5/2012  | Kim et al. .............. 370/329 |
| 2012/0142268 A1* | 6/2012  | Tao et al. ............. 455/3.05 |
| 2014/0177502 A1* | 6/2014  | Kim et al. .............. 370/311 |
| 2014/0307618 A1* | 10/2014 | Kim et al. .............. 370/312 |

OTHER PUBLICATIONS

PCT International Application No. PCT/KR2012/001698, Written Opinion of the International Searching Authority dated Oct. 24, 2012, 21 pages.

(Continued)

*Primary Examiner* — Melanie Jagannathan
(74) *Attorney, Agent, or Firm* — Lee, Hong, Degerman, Kang & Waimey

(57) ABSTRACT

The present invention relates to a method for transmitting/receiving control information for an M2M device, and a device for same. A method of transmitting Machine to machine (M2M) device control information from a base station in a wireless communication system according to an embodiment of the present invention includes: transmitting a first message including at least one M2M identifier (ID) field to the at least one M2M device; and transmitting at least one second message including resource allocation information for the at least one M2M device to the at least one M2M device. The first and second messages have different types of formats.

8 Claims, 5 Drawing Sheets

(56) References Cited

OTHER PUBLICATIONS

Anshuman Nigam, et al., "[DEV] Addressing for 802.16p", IEEE 802.16 Broadband Wireless Access Working Group, IEEE C802.16p-rg-11/0043r1, Feb. 24, 2011, 5 pages.

Yi-Ting Lin, et al., "Addressing for M2M Devices and Corresponding Masking Schemes of A-A-MAP IEs", IEEE 802.16 Broadband Wireless Access Working Group, IEEE C802.16p-11/0028, Mar. 6, 2011, 6 pages.

Rui Huang, et al., "Proposed text for addressing of STID Addressing Scheme in IEEE 802.16p system", IEEE 802.16 Broadband Wireless Access Working Group, IEEE C802.16p-11/0014, Mar. 3, 2011, 5 pages.

Kiseon Ryu, "IEEE 802.16p Machine to Machine (M2M) Consolidated Contributions for PWR RG", IEEE 802.16 Broadband Wireless Access Working Group, IEEE C802.16p-rg-11/0032r7, Feb. 25, 2011, (relevant pp. 5-12).

* cited by examiner

METHOD FOR TRANSMITTING/RECEIVING CONTROL INFORMATION FOR AN M2M DEVICE, AND DEVICE FOR SAME

CROSS-REFERENCE TO RELATED APPLICATIONS

This application is the National Stage filing under 35 U.S.C. 371 of International Application No. PCT/KR2012/001698, filed on Mar. 8, 2012, which claims the benefit of U.S. Provisional Application Ser. No. 61/450,562, filed on Mar. 8, 2011, the contents of which are all hereby incorporated by reference herein in their entirety.

TECHNICAL FIELD

The present invention relates to a wireless communication, and more particularly, to a method of transmitting/receiving control information for a M2M device and an apparatus therefore.

BACKGROUND ART

Generally, a machine-to-machine (hereinafter abbreviated M2M) communication literally means a communication between one electronic device and another electronic device. In a broad sense, the M2M communication may mean a wire/wireless communication between electronic devices or a communication between a human-controllable device and a machine. Recently, the M2M communication may generally indicate a communication between electronic devices, i.e., a device-to-device wireless communication performed without human involvement.

In the early 1990's, in which the concept of the M2M communication has been initially introduced, the M2M communication has been recognized as remote control or telematics or the like and derivative markets of the M2M communication were very limitative. Yet, the M2M communication has grown rapidly for past few years and has become the globally noteworthy markets. Specifically, in POS (point of sales) and security related application markets, the M2M communication has considerably influence on such field as fleet management, remote monitoring of machinery and equipment, smart meter for auto-measurement of operating time, consumed heat or electricity quantity on construction machinery equipment and the like. M2M communication in the future will be further utilized for various usages in connection with a small-scale output communication solution such as conventional mobile communication, wireless high-speed internet, Wi-Fi, ZigBee and the like and may lay the foundation of expansion to B2C (business to consumer) markets instead of being confined to B2B (business to business) markets.

In the era of the M2M communication, every machine equipped with SIM (subscriber identity module) card enables data transmission and reception and is capable of remote management and control. For instance, as M2M communication technology is usable for numerous devices and equipment including vehicles, trucks, trains, containers, auto-vending machines, gas tanks and the like, its application fields may reach far and wide.

According to a related art, since mobile stations are managed by individual unit in general, a communication between a base station and a mobile station is usually performed by a one-to-one communication scheme. Assuming that numerous M2M devices communicate with a base station by the one-to-one communication scheme, network may be overloaded due to the occurrence of signaling between the base station and each of the numerous M2M devices. As mentioned in the above description, in case that the M2M communications are rapidly spreading across a wider scope, overheads due to the communications between the M2M devices or the communications between the base station and the M2M devices may cause problems.

Meanwhile, there exists a necessity for a base station to transmit control information to M2M devices even though there is a problem of a considerable overhead due to the transmission of the control information to a plurality of the M2M devices. However, a method of reducing the overhead has not been proposed in detail yet.

DISCLOSURE OF THE INVENTION

Technical Tasks

One object of the present invention is to provide a method for a base station to transmit M2M device control information.

Another object of the present invention is to provide a method for a M2M device to receive control information in a wireless communication system.

Another object of the present invention is to provide a base station device capable of transmitting M2M device control information.

Another object of the present invention is to provide a M2M device capable of receiving control information in a wireless communication system.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve the aforementioned technical task and in accordance with the purpose of the invention, as embodied and broadly described herein, according to the present invention a method of transmitting control information for a machine to machine (M2M) device by a base station in a wireless communication system includes transmitting a first message including at least one M2M identifier (ID) field to at least one M2M device and transmitting at least one second message including a resource allocation information for the at least one M2M device to the at least one M2M device, wherein the first and the second message have a format different from each other. If the first message includes a plurality of M2M ID fields, the second message can be transmitted to each of M2M devices corresponding to a plurality of the M2M ID fields. The first message may correspond to a M2M identifier A-MAP IE message and the second message may correspond to a unicast assignment A-Map IE message.

To further achieve the aforementioned different technical task and in accordance with the purpose of the invention, as embodied and broadly described herein, according to one embodiment of the present invention a method of receiving control information by a machine to machine (M2M) device in a wireless communication system includes receiving a first message including at least one M2M identifier (ID) field from a base station, checking whether an ID of the M2M device is included in the first message, and if the ID of the M2M device is included in the first message, receiving a second message including a resource allocation information for the M2M device from the base station, wherein the first and the second message have a format different from each other. Checking whether the ID of the M2M device is included in the first message is performed based on a rest of M2M ID fields except a M2M ID field configured with a pre-defined value in the first message. The pre-defined value may correspond to 0. At least one of the first and the second message can be transmitted in a manner of being CRC (Cyclic Redundancy Check) masked with a M2M group ID. The first message may further include a field for indicating numbers of a M2M ID and it is able to check whether the ID of the M2M device is included in the first message based on the indicated numbers of the M2M ID. The first message may correspond to a M2M identifier A-MAP IE message. The M2M identifier A-MAP IE message may correspond to an extended assignment A-MAP IE type. The second message may correspond to a unicast assignment A-MAP IE.

To further achieve the aforementioned different technical task and in accordance with the purpose of the invention, as embodied and broadly described herein, according to one embodiment of the present invention, a base station for transmitting control information for a M2M device control information in a wireless communication system includes a transmitter configured to transmit a first message including at least one M2M identifier (ID) field to at least one M2M device and configured to transmit at least one second message including resource allocation information for the at least one M2M device to the at least one M2M device, wherein the first and the second message have a format different from each other.

To further achieve the aforementioned different technical task and in accordance with the purpose of the invention, as embodied and broadly described herein, according to one embodiment of the present invention, a M2M device for receiving control information in a wireless communication system includes a receiver configured to receive a first message including at least one M2M identifier (ID) from a base station and a processor configured to check whether the ID of the M2M device is included in the first message, wherein if the ID of the M2M device is included in the first message, the receiver is configured to receive a second message including a resource allocation information for the M2M device from the base station and wherein the first and the second message have a format different from each other. Checking whether the ID of the M2M device is included in the first message can be performed based on a rest of M2M ID fields except a M2M ID field configured with a pre-defined value in the first message. The first message may further include a field for indicating numbers of a M2M ID and the processor is configured to check whether the ID of the M2M device is included in the first message based on the indicated numbers of the M2M ID.

Advantageous Effects

According to various embodiments of the present invention, a base station transmits a M2M identifier A-MAP IE to a M2M device in a manner of including a plurality of M2M IDs and transmits resource allocation information for a plurality of M2M IDs via unicast assignment A-MAP IEs, thereby considerably reducing control information transmission overhead.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
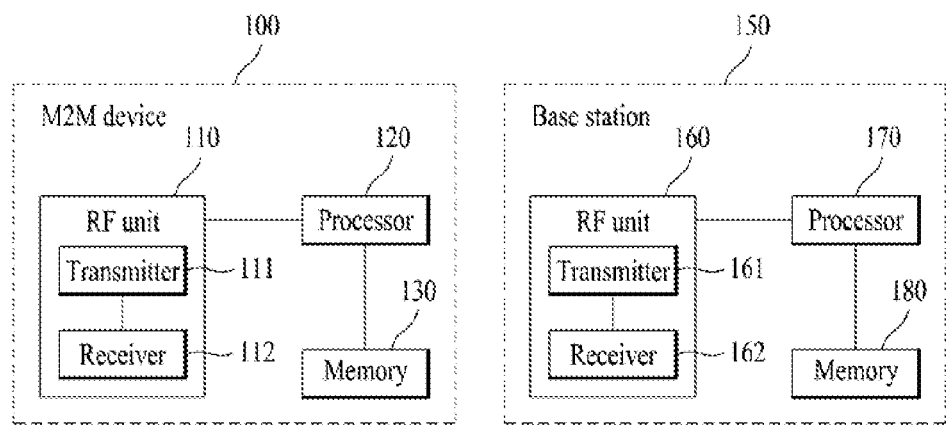
FIG. 1 is a schematic diagram for configurations of an M2M device and a base station according to one embodiment of the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. Detailed description disclosed together with the accompanying drawings is intended to explain not a unique embodiment of the present invention but an exemplary embodiment of the present invention. For instance, although the following descriptions are made in detail on the assumption that a mobile communication system includes 3GPP LTE and LTE-A system, they are applicable to other random mobile communication systems except unique features of 3GPP LTE and LTE-A system.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station is a common name of such a random node of a network stage communicating with a terminal as a Node B, an eNode B, a base station (BS), an access point (AP) and the like.

In a mobile communication system, a mobile station may be able to receive information in downlink from a base station and transmit information in uplink to the base station. The informations transmitted or received by the mobile station may include data and various control informations. And, various kinds of physical channels may exist in accordance with types and usages of the informations transmitted or received by the mobile station.

First of all, the following description of the present invention may be usable for various wireless access schemes including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution) and the like. OFDMA can be implemented with such a radio technology as IEEE (Institute of Electrical and Electronics Engineers) 802.11 (Wi-Fi), IEEE 802.16 (WiMAX), IEEE 802.20, E-UTRA (Evolved UTRA) and the like. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in DL and SC-FDMA in UL. And, LTE-A (LTE-Advanced) is an evolved version of LTE.

For clarity, although the present invention is described centering on IEEE 802.16, the technical idea of the present invention may be non-limited to IEEE 802.16 system. And, specific terminologies used in the following description are provided to help understand the present invention and the use of the specific terminologies can be modified into a different form in a range of not deviating from the technical idea of the present invention.

FIG. 1 is a schematic diagram for configurations of an M2M device and a base station according to one embodiment of the present invention.

Referring to FIG. 1, an M2M device 100, which may be named an M2M communication device but will be named as an M2M device in the following, may include an RF unit 110, a processor 120 and a memory 130. In this case, the memory 130 is an optional component. And, a base station 150 may include an RF unit 160, a processor 170 and a memory 180. In this case, the memory 180 is an optional component. The RF unit 110/160 may include a transmitter 111/161 and a receiver 112/162. For example of the M2M device 100, the transmitter 111 is configured to transmit signals to the base station 150 and other M2M devices. And, the receiver 112 is configured to receive signals from the base station 150 and other M2M devices. The processor 120 can be configured to control the transmitter 111 and the receiver 112 to transmit/receive a signal with different devices in a manner of being functionally connected to the transmitter 111 and the receiver 112. The processor 120 performs various processing on a signal to transmit and then transfers the processed signal to the transmitter 111. And, the processor 120 may process a signal received by the receiver 112. If necessary, the processor 120 may store information contained in an exchanged message in the memory 130. The above-configured M2M device 100 may perform various methods according to embodiments of the present invention mentioned in the following description.

Meanwhile, although it is not depicted in FIG. 1, the M2M device 100 may further include various kinds of additional components according to its machine application type. In case that the corresponding M2M device 100 is provided for the smart meter, it may further include an additional configuration for power measurement and the like. This power measuring operation may be under the control of the processor 120 shown in FIG. 1 or a separately configured processor (not shown in the drawing).

Although FIG. 1 shows a case that a communication is performed between the M2M device 100 and the base station 150 for example, an M2M communication method according to the present invention may be performed between M2M devices. In particular, each of the M2M devices may have the same device configurations shown in FIG. 1 to perform various methods according to embodiments of the present invention mentioned in the following description.

The transmitter 161 of the base station 150 is configured to transmit signals to another base station, an M2M server and M2M devices. And, the receiver 162 of the base station 150 is configured to receive signals from another base station, an M2M server and M2M devices. The processor 170 is functionally connected to each of the transmitter 161 and the receiver 162 to control a process for the transmitter 161 and the receiver 162 to transceive signals with other devices. The processor 170 performs various kinds of processing on a signal to transmit and then transfers the processed signal to the transmitter 161. And, the processor 170 may be able to perform processing on a signal received by the receiver 162. If necessary, the processor 170 may store information contained in an exchanged message in the memory 180. The above-configured base station 150 may perform various methods according to embodiments of the present invention mentioned in the following description.

The processor 120 of the M2M device 100 directs operations (e.g., control, adjustment, management, etc.) in the M2M device 100. The processor 170 of the base station directs operations (e.g., control, adjustment, management, etc.) in the base station 150. The processor 120/170 may be connected to the memory 130/180 configured to store program codes and data. The memory 130/180 is connected to the processor 120/170 to store operating systems, applications and general files.

The processor 120/170 may be named one of a controller, a microcontroller, a microprocessor, a microcomputer and the like. Moreover, the processor 120/170 may be implemented by hardware, firmware, software or a combination thereof. In case of implementing an embodiment of the present invention using hardware, the processor 120/170 may be provided with such a configuration to perform the present invention as ASICs (application specific integrated circuits), DSPs (digital signal processors), DSPDs (digital signal processing devices), PLDs (programmable logic devices), FPGAs (field programmable gate arrays), and the like.

In case of implementing embodiments of the present invention using firmware or software, the firmware or software may be configured to include modules, procedures, and/or functions for performing the functions or operations of the present invention. And, the firmware or software configured to perform the present invention may be driven by the processor 120/170 in a manner of being installed at the processor 120/170 or being saved in the memory 130/180.

In the following description, an M2M communication may mean an information exchange performed between mobile stations or between a base station and each of mobile stations without human involvement. Hence, the M2M device may mean a mobile station capable of supporting the above-mentioned M2M device communication. An access service network for an M2M service may be defined as an M2M ASN (M2M access service network) and a network entity performing communications with M2M devices may be named an M2M server. In particular, the M2M server activates an M2M application and provides an M2M-specific service for at least one or more M2M devices. An M2M feature indicates a feature of an M2M application. And, at least one feature may be necessary to provide an application. An M2M device group may mean a group of M2M devices that share at least one common feature with each other.

The devices performing communications by M2M scheme may be variously named M2M devices, M2M communication devices, MTC (machine type communication) devices and the like. And, the number of the devices will increase gradually as the number of machine application types does.

The currently discussed machine application types may include (1) security, (2) public safety, (3) tracking and tracing, (4) payment, (5) healthcare, (6) remote maintenance and control, (7) metering, (8) consumer device, (9) POS (Point Of Sales) and fleet Management in security related market, (10) M2M communication of vending machine (11) smart meter for plant and machinery remote monitoring, operating time measurement on measurement on construction plant and machinery and auto-measurement of consumed heat or electricity quantity on construction plant and machinery, (12) surveillance video communication and the like, by which the machine application types may be non-limited. And, there are ongoing discussions on other machine application types.

According to properties of M2M devices, the M2M device may have low mobility or no mobility. If a prescribed M2M device has considerably low mobility or does not have mobility at all, it may mean that the corresponding M2M device is stationary in the long term. An M2M communication system may be able to simplify or optimize mobility related operations for a specific M2M application related to such an M2M device having a stationary location as an M2M device for secured access and surveillance, an M2M device for public safety, an M2M device for payment, an M2M device for remote maintenance and control, an M2M device for metering and the like.

In the following description, an embodiment of the present invention is explained with reference to a case of applying M2M communication to a wireless communication system (e.g., IEEE 802.16e/m), by which the present invention may be non-limited. And, an embodiment of the present invention is applicable to such a different wireless communication system as 3GPP LTE system and the like in the same manner.

In a legacy system (e.g., IEEE 802.16e or IEEE 802.16m), a CID (connection identifier) or a station ID is assigned to distinguish mobile stations in a connected mode within a base station or a cell. In case that a base station allocates a resource to a mobile station, an assigned ID can be used. Or, in case that a mobile station informs of what the mobile station is (e.g., an ID is inserted to a BR header in case of a contention-based BR (Bandwidth Request)), an assigned ID can be used.

As mentioned in the foregoing description, since there are considerable numbers (e.g., hundred times~thousands times of a legacy mobile station) of devices using M2M applications in a system capable of supporting the M2M applications (for instance, a secured access and surveillance, a public safety, a payment, a remote maintenance and control, a metering) compared to a legacy system, in order to efficiently manage M2M devices, the M2M devices should be managed by a group unit including a specific attribute (e.g., M2M subscriber unit).

And, in case that a base station transmits an identical data to the M2M devices belonging to a specific group, a multicast form is more efficient than a unicast form to transmit the identical data to the M2M devices. In order to perform the aforementioned multicast transmission and a group management, a base station can assign a group ID (In the present invention, it is represented as an M2M group ID (MGID)) indicating a group to which an M2M device belongs and a device ID (In the present invention, it is represented as an M2M device ID (MDID)) configured to distinguish the M2M devices belonging to a group.

The present invention proposes a detailed method of using an M2M group ID and an M2M device ID.

The M2M group ID is an ID indicating an M2M group to which an M2M device belongs, is used to identify the M2M group, and is used in a whole network to distinguish the M2M group. The M2M device ID is an ID of each of the M2M devices belonging to one M2M group. The M2M device ID is used to identify individual M2M devices belonging to a group.

The M2M group ID can be used by a base station to perform a group paging when it is necessary for the base station to page all M2M devices in an idle mode belonging to a group. And, when a data, which should be received by all M2M devices belonging to a group, is transmitted, i.e., when a multicast data is transmitted, a base station can transmit the multicast data using the M2M group ID. Meanwhile, the base station can use the M2M device ID to transmit a unicast data.

In order to allocate a downlink/uplink (DL/UL) resource for the unicast data, the M2M group ID and the M2M device ID are delivered in a form of control information (e.g., MAP). When a processor 120 of an M2M device receives a MAP, the processor of the M2M device can check whether the MAP corresponds to the M2M device in a manner of checking the MGID and the MDID.

If it is applied to IEEE 802.16m system, a base station transmits an MGID in a manner of masking a CRC (cyclic redundancy check) of MAP with the MGID and an MDID is inserted to a unicast assignment A-MAP IE as a field. A following Table 1 indicates an example of an M2M DL/UL basic assignment A-MAP IE message format transmitted to an M2M device by a base station.

TABLE 1

| Syntax | Size (bits) | Notes |
| --- | --- | --- |
| A-MAP IE type | 4 | M2M DL/UL basic Assignment A-MAP IE |
| M2M_ID | 16 | Identifies an M2M device belonging to an M2M group |
| ISizeOffset | 5 | Offset used to compute burst size index |
| ... | ... | ... |
| Reserved | TBD | |

Referring to Table 1, the M2M DL/UL basic assignment A-MAP IE message format includes an M2M ID field of 16 bit. In this case, an M2M ID is used to identify an M2M device belonging to an M2M group. A 16-bit CRC is generated based on randomized contents of an M2M DL/UL basic assignment A-MAP IE and the CRC is masked by a 16 bit-CRC mask generated according to a following Table 2.

The following Table 2 is a table for describing a CRC mask.

TABLE 2

| Masking Prefix (1 bit MSB) | Remaining 15 bit LSBs | |
| --- | --- | --- |
| 0b0 | Type Indicator | Masking Code |
| | 0b000 | 12 bit STID or TSTID |
| | 0b001 | Refer to Table 844 |
| | 0b010 | Refer to Table 845 |
| | 0b011-0b111 | 12 LSBs of 15 bit MGID |

An MGID is masked with a CRC of an assignment A-MAP IE for M2M devices and an M2M ID (M2M device ID) is transmitted in a manner of being included in the assignment A-MAP IE. In this case, since the assignment A-MAP IE for M2M devices includes the M2M ID, the assignment A-MAP IE may over a conventionally fixed size (40 bits except the CRC). For instance, if the assignment A-MAP IE becomes 60 bits as a result of including the M2M ID, since the assignment A-MAP IE has a MAP of a different size, it is necessary to perform an operation of adjusting the size of the assignment A-MAP IE to 40 bits.

As a first method to perform the operation, there is a method of using a MAP segmentation, which was used for a GRA (group resource allocation). To this end, it may refer to Assignment A-MAP IE Segmentation of IEEE 802.16m. As a different method, an M2M identifier A-MAP IE including an M2M device ID (M2M ID) for indicating an M2M device is defined, a CRC of a corresponding IE is masked with an MGID, and the M2M ID is included in the M2M identifier A-MAP IE.

A base station can transmit an M2M ID and resource allocation information to an M2M device via a separate A-MAP IE. In particular, the base station transmits an M2M identifier A-MAP IE in a manner of including the M2M ID and can transmit the resource allocation information to the M2M device via a separate A-MAP IE, e.g., a unicast assignment A-MAP IE. The corresponding M2M identifier A-MAP IE comes prior to a different unicast assignment.

A following Table 3 indicates one example of the M2M identifier A-MAP IE proposed by the present invention.

TABLE 3

| Syntax | Size (bits) | Notes |
|---|---|---|
| A-MAP IE type | 4 | M2M-MAP IE |
| M2M_ID | 16 | Identifies an M2M device belonging to an M2M group |
| Reserved | 20 | Reserved bits |

Referring to Table 3, an M2M identifier A-MAP IE message can include an M2M ID field of 16 bits. The M2M ID field is a field configured to identify an M2M device belonging to an M2M group.

A 16-bit CRC is generated based on randomized contents of an M2M DL/UL basic assignment A-MAP IE and the CRC is masked by a 16 bit-CRC mask generated according to the aforementioned Table 2.

In this case, if a unicast assignment A-MAP IE masked with an identical MGID is positioned after the M2M identifier A-MAP IE masked with the MGID, the unicast assignment A-MAP IE is used for an M2M device, which is identified by an M2M ID and an MGID included in the M2M identifier A-Map IE.

In case of the aforementioned case, since all unicast assignment A-MAP IEs transmitted to the M2M device by the base station need a respective M2M identifier A-MAP IE, it may increases a MAP overhead. Hence, the present invention proposes a method capable of performing a resource allocation or a unicast transmission to one or two M2M devices using a single M2M identifier A-MAP IE. A following Table 4 indicates the M2M identifier A-MAP IE configured to support 2 M2M devices.

TABLE 4

| Syntax | Size (bits) | Notes |
|---|---|---|
| A-MAP IE type | 4 | M2M-MAP IE |
| M2M_ID 1 | 16 | Identifies an M2M device belonging to an M2M group |
| M2M_ID 2 | 16 | Identifies an M2M device belonging to an M2M group |
| Reserved | 4 | Reserved bits |

Referring to Table 4, an M2M identifier A-MAP IE message can include two M2M ID fields (M2M_ID_1 and M2M_ID_2). In particular, two M2M IDs can be inserted into the M2M identifier A-MAP IE. The base station can transmit a unicast assignment A-MAP IE to the two M2M devices using the M2M identifier A-MAP IE.

Figure 2:
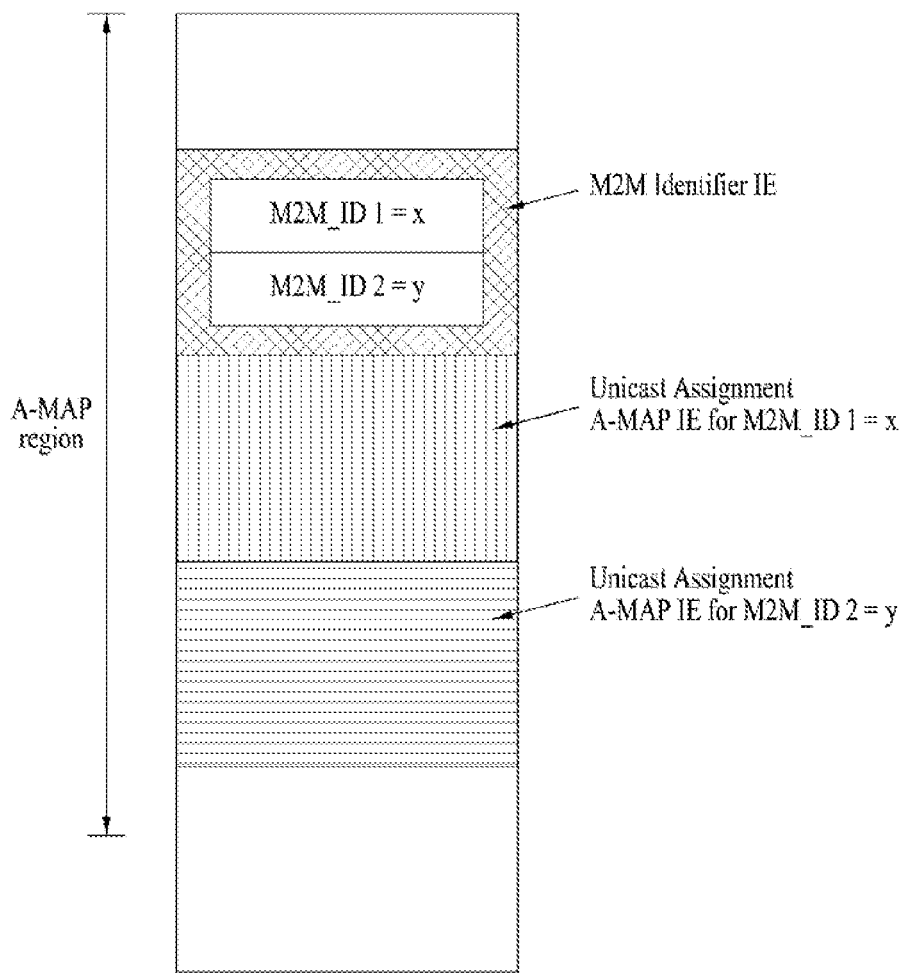
FIG. 2 is a diagram of an M2M identifier A-MAP IE and a unicast assignment A-MAP IE included in an A-MAP IE region according to one embodiment of the present invention.

FIG. 2 is a diagram of an M2M identifier A-MAP IE and a unicast assignment A-MAP IE included in an A-MAP IE region according to one embodiment of the present invention.

Referring to FIG. 2, the A-MAP region can include an M2M identifier A-MAP IE region and a unicast assignment A-MAP IE region. In this case, the M2M identifier A-MAP IE can include two IDs (i.e., M2M_ID 1=x and M2M_ID2=y) and a unicast assignment A-MAP IE for an M2M device corresponding to each ID can be positioned after the M2M identifier A-MAP IE. A unicast assignment A-MAP IE for the M2M_ID 1 can be positioned after the M2M identifier A-MAP IE and a unicast assignment A-MAP IE for the M2M_ID 2 can be positioned after the unicast assignment A-MAP IE for the M2M_ID 1. By doing so, since a resource allocation for two M2M devices can be performed by using a single M2M identifier A-MAP IE, A-MAP overhead can be reduced.

Since the aforementioned example assumed a case that the M2M ID is 16 bit in size, the M2M identifier A-MAP IE can include maximum two IDs.

If it is generalized, the M2M identifier A-MAP IE can include at least one ID in accordance with a size of the M2M ID (or M2M device ID (MDID)). For instance, assume that a remaining space of an IE corresponds to 36 bits except an A-MAP IE type field of 4 bits and a CRC of 16 bits. If the M2M ID corresponds to 12 bits, the M2M identifier A-MAP IE can include three M2M IDs of the M2M device. If the M2M ID corresponds to 8 or 9 bits, the M2M identifier A-MAP IE can include four M2M IDs of the M2M device. If the M2M ID corresponds to 16 or 18 bits, the M2M identifier A-MAP IE can include two M2M IDs of the M2M device. If the M2M ID is greater than 18 bits, the M2M identifier A-MAP IE can include one M2M ID only.

Following tables indicate examples of an M2M identifier A-MAP IE including at least one M2M ID, when the M2M ID corresponds to 8 bits, 12 bits, and 24 bits, respectively.

A following Table 5 indicates an example of the M2M identifier A-MAP IE message format in case that the M2M ID corresponds to 8 bits.

TABLE 5

| Syntax | Size (bits) | Notes |
|---|---|---|
| A-MAP IE type | 4 | M2M-MAP IE |
| M2M_ID 1 | 8 | Identifies an M2M device belonging to an M2M group |
| M2M_ID 2 | 8 | Identifies an M2M device belonging to an M2M group |
| M2M_ID 3 | 8 | Identifies an M2M device belonging to an M2M group |
| M2M_ID 4 | 8 | Identifies an M2M device belonging to an M2M group |
| Reserved | 4 | Reserved bits |

Referring to Table 5, the M2M identifier A-MAP IE message format can include four M2M ID fields in case that the M2M ID corresponds to 8 bits and four unicast assignment A-MAP IEs can be positioned after the M2M identifier A-MAP IE.

A following Table 6 indicates an example of the M2M identifier A-MAP IE message format in case that the M2M ID corresponds to 12 bits.

TABLE 6

| Syntax | Size (bits) | Notes |
|---|---|---|
| A-MAP IE type | 4 | M2M-MAP IE |
| M2M_ID 1 | 12 | Identifies an M2M device belonging to an M2M group |
| M2M_ID 2 | 12 | Identifies an M2M device belonging to an M2M group |
| M2M_ID 3 | 12 | Identifies an M2M device belonging to an M2M group |

Referring to Table 6, the M2M identifier A-MAP IE message format can include three M2M ID fields in case that the M2M ID corresponds to 12 bits and three unicast assignment A-MAP IEs can be positioned after the M2M identifier A-MAP IE.

A following Table 7 indicates an example of the M2M identifier A-MAP IE message format in case that the M2M ID corresponds to 24 bits.

TABLE 7

| Syntax | Size (bits) | Notes |
|---|---|---|
| A-MAP IE type | 4 | M2M-MAP IE |
| M2M_ID | 24 | Identifies an M2M device belonging to an M2M group |
| Reserved | 12 | Reserved bits |

Referring to Table 7, the M2M identifier A-MAP IE message format can include one M2M ID fields only in case that the M2M ID corresponds to 24 bits. In this case, although the M2M identifier A-MAP IE includes two M2M device IDs, the M2M identifier A-MAP IE can be used to allocate a resource for one M2M device.

In the following description, the present invention proposes a method for an M2M identifier A-MAP IE to include an ID for one M2M device.

As a first method, an M2M ID of the M2M identifier A-MAP IE has an ID in ascending order. In particular, a value of an M2M_ID 1 cannot be greater than a value of an M2M_ID 2. Hence, if the M2M_ID 1 has a value greater than that of the M2M_ID 2, the M2M_ID 2 is not used or ignored.

A following Table 8 is a table indicating an example of the M2M identifier A-MAP IE message format to support two M2M devices.

TABLE 8

| Syntax | Size (bits) | Notes |
|---|---|---|
| A-MAP IE type | 4 | M2M-MAP IE |
| M2M_ID 1 | 16 | Identifies an M2M device belonging to an M2M group |
| M2M_ID 2 | 16 | Identifies an M2M device belonging to an M2M group. If a value of this ID has a value greater than that of a previous M2M_ID, this ID is ignored and only one (i.e. for a previous ID) unicast assignment A-MAP IF comes after this M2M identifier A-MAP IE only. In particular, the unicast assignment A-MAP IE for this ID does not come after. |
| Reserved | 4 | Reserved bits |

Referring to Table 8, the M2M_ID of the M2M identifier A-MAP IE has an ID in ascending order. In particular, the value of the M2M_ID 1 cannot be greater than that of the M2M_ID 2. Hence, if the M2M_ID 1 has a value greater than that of the M2M_ID 2, the M2M_ID 2 is not used or ignored.

Subsequently, a second method proposed by the present invention corresponds to a method extended by the first method. The second method is explained with reference to a following FIG. 3.

Figure 3:
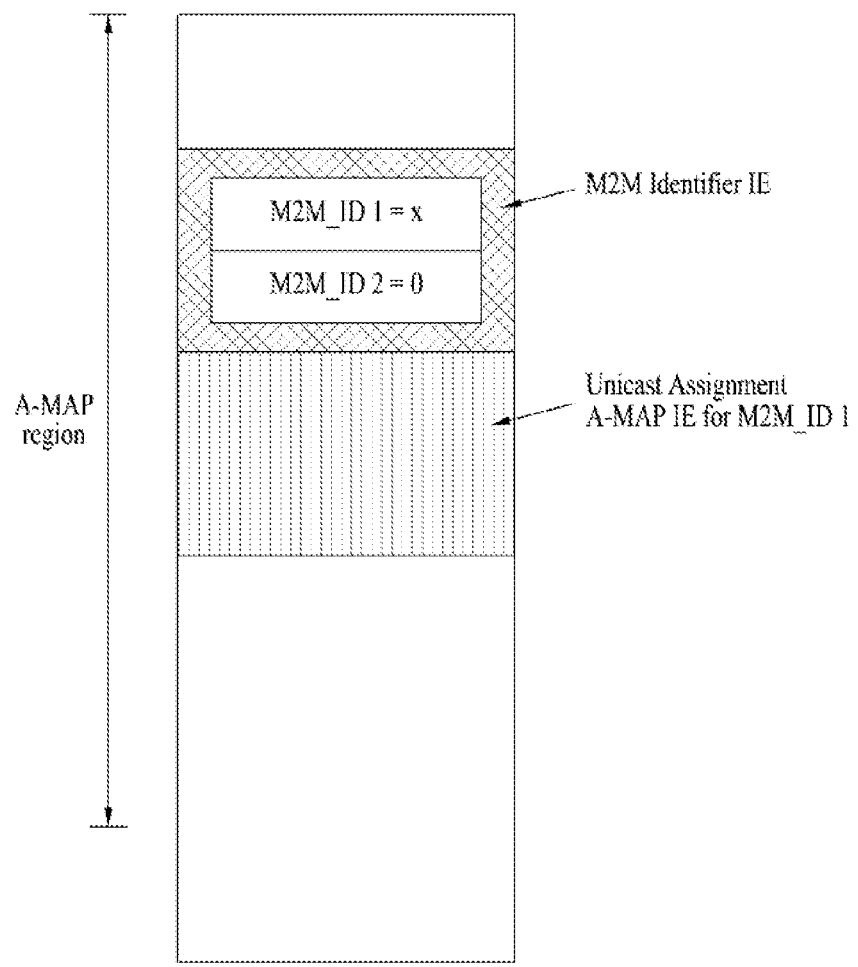
FIG. 3 is a diagram of an M2M identifier A-MAP IE and a unicast assignment A-MAP IE included in an A-MAP IE region according to a different embodiment of the present invention.

FIG. 3 is a diagram of an M2M identifier A-MAP IE and a unicast assignment A-MAP IE included in an A-MAP IE region according to a different embodiment of the present invention.

Referring to FIG. 3, when a base station uses one M2M device only by using an M2M identifier A-MAP IE, a value of a second ID (i.e., M2M_ID 2) is set to 0. If the value of the M2M_ID 2 is set to 0, one unicast assignment A-MAP IE comes after the M2M identifier A-MAP IE only and a corresponding IE corresponds to an M2M ID_1. In particular, setting an M2M ID to 0 is possible only in a first M2M ID. In particular, the rest of the M2M IDs except the first ID cannot have 0. Hence, if two M2M devices are assigned, it will be assigned according to an ID order.

A following Table 9 indicates an example of the M2M identifier A-MAP IE message format to support two M2M devices.

TABLE 9

| Syntax | Size (bits) | Notes |
|---|---|---|
| A-MAP IE type | 4 | M2M-MAP IE |
| M2M_ID 1 | 16 | Identifies an M2M device belonging to an M2M group |
| M2M_ID 2 | 16 | Identifies an M2M device belonging to an M2M group If a value of this ID has a value of 0, this ID is ignored and only one (i.e. for a previous ID) unicast assignment A-MAP IE comes after this M2M identifier A-MAP IE. In particular, the unicast assignment A-MAP IE for this ID does not come after. |
| Reserved | 4 | Reserved bits |

Referring to Table 9, the example considers a case that an M2M ID is 16-bit in size. As mentioned earlier, in case that the M2M ID corresponds to a different size (e.g., 8 bits, 10 bits, 12 bits, 20 bits, 24 bits, and the like), one or more M2M IDs can be included in an M2M identifier A-MAP IE and a value of each M2M ID is sequentially listed. The rest of the M2M IDs except the first one cannot have a value of 0. If an M2M ID except the first one has a value of 0, the corresponding ID is ignored and a unicast assignment A-MAP for the corresponding ID does not show up.

As a third method, a specific value (e.g., 0 or 111 . . . 111) of an M2M ID is reserved as a value of no use, the M2M ID including the specific value is ignored, and a unicast assignment A-MAP IE for the corresponding ID does not show up.

An example in the following description indicates that 0 is reserved. A following Table 10 indicates an example of the M2M identifier A-MAP IE message format to support two M2M devices.

TABLE 10

| Syntax | Size (bits) | Notes |
|---|---|---|
| A-MAP IE type | 4 | M2M-MAP IE |
| M2M_ID 1 | 16 | Identifies an M2M device belonging to an M2M group If a value of this ID has a value of 0, this ID is ignored and only one (i.e. for a previous ID) unicast assignment A-MAP IE comes after this M2M |

TABLE 10-continued

| Syntax | Size (bits) | Notes |
|---|---|---|
| | | identifier A-MAP IE. In particular, the unicast assignment A-MAP IE for this ID does not come after. |
| M2M_ID 2 | 16 | Identifies an M2M device belonging to an M2M group If a value of this ID has a value of 0, this ID is ignored and only one (i.e. for a previous ID) unicast assignment A-MAP IE comes after this M2M identifier A-MAP IE. In particular, the unicast assignment A-MAP IE for this ID does not come after. |
| Reserved | 4 | Reserved bits |

Referring to Table 10, in case that an M2M ID corresponds to 16-bit in size, an M2M identifier A-MAP IE message can include two M2M ID fields. In this case, a specific value 0 of an M2M ID is reserved as a value of no use and the M2M ID including the specific value can be ignored.

As a fourth method, the M2M identifier A-MAP IE message can include an ID number field to indicate the numbers of M2M IDs. This method is explained with reference to a following FIG. 4.

Figure 4:
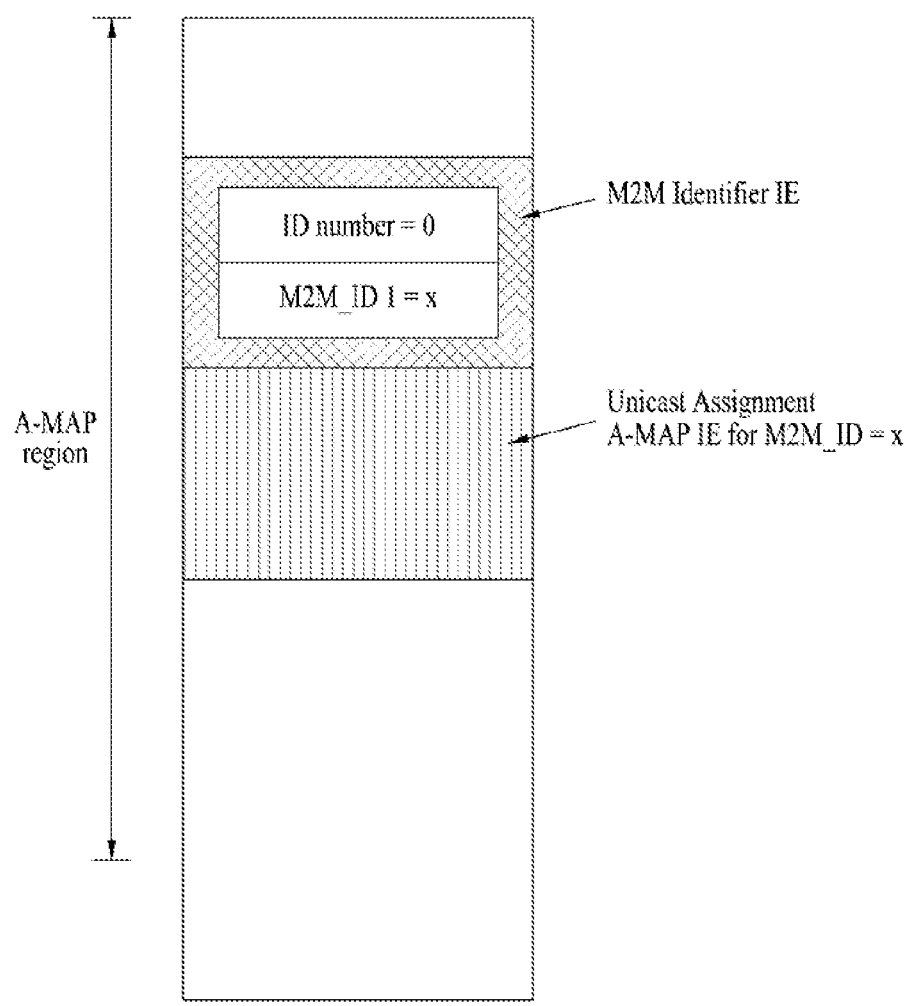
FIG. 4 and FIG. 5 are diagrams of an M2M identifier A-MAP IE and a unicast assignment A-MAP IE included in an A-MAP IE region according to different embodiments of the present invention, respectively.
Figure 5:
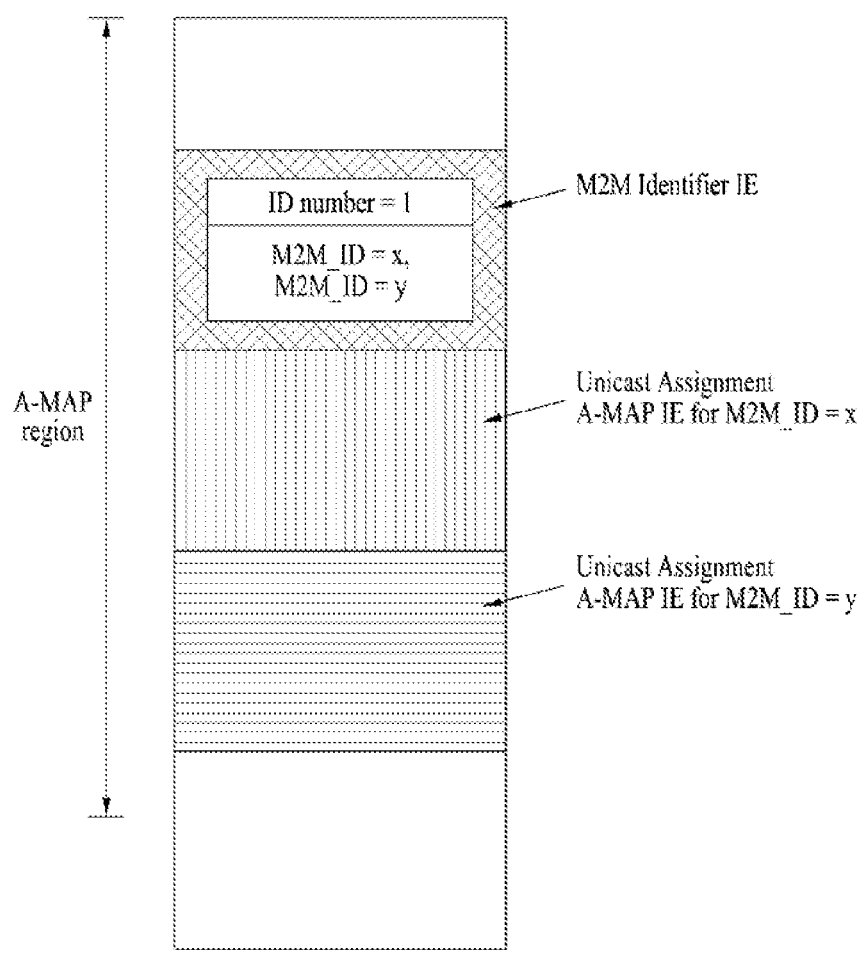

FIG. 4 and FIG. 5 are diagrams of an M2M identifier A-MAP IE and a unicast assignment A-MAP IE included in an A-MAP IE region according to different embodiments of the present invention, respectively.

A following Table 11 indicates an example of the M2M identifier A-MAP IE message format to support two M2M devices.

TABLE 11

| Syntax | Size (bits) | Notes |
|---|---|---|
| A-MAP IE type | 4 | M2M-MAP IE |
| ID number | 1 | 0: includes 1 ID 1: includes 2 IDs |
| If (ID number ==0) { | | |
| M2M_ID 1 | 16 | Identifies an M2M device belonging to an M2M group |
| Reserved | 19 | |
| } else { | | |
| M2M_ID 1 | 16 | Identifies an M2M device belonging to an M2M group |
| M2M_ID 2 | 16 | Identifies an M2M device belonging to an M2M group |
| Reserved | 3 | Reserved bits |
| } | | |

Referring to Table 11, an M2M identifier A-MAP IE can include an ID number field to indicate the numbers of M2M IDs. If the number of an M2M ID corresponds to 1, only one M2M ID field (M2M_ID 1) is included. If the number of the M2M ID corresponds to 2, two M2M ID fields are included.

As depicted in FIG. 4, if the ID number field is set to 0, in particular, if one M2M ID (M2M ID='x') is included, one unicast assignment A-MAP IE is positioned after the M2M identifier A-MAP IE. The one unicast assignment A-MAP IE corresponds to the unicast assignment A-MAP IE for the M2M ID='x'.

As depicted in FIG. 5, if the ID number field is set to 1, in particular, if two M2M IDs (M2M ID='x' and M2M ID='y') are included, two unicast assignment A-MAP IEs are positioned after the M2M identifier A-MAP IE. In particular, a unicast assignment A-MAP IE for the M2M ID='x' and a unicast assignment A-MAP IE for the M2M ID='y' can be sequentially positioned after the M2M identifier A-MAP IE.

The aforementioned examples of the first, second, third, and fourth methods have considered a case that an M2M ID is 16-bit in size. As mentioned in the foregoing description, in case that the M2M ID corresponds to a different size (e.g., 8 bits, 10 bits, 12 bits, 20 bits, 24 bits, and the like), one or more M2M IDs can be included in an M2M identifier A-MAP IE and a value of each M2M ID will be sequentially listed.

In the foregoing description, an example that an M2M identifier A-MAP IE exists in a form of an A-MAP IE type is explained. Yet, the M2M identifier A-MAP IE may exist in a form of an extended assignment A-MAP IE.

A following Table 12 indicates an example of the M2M identifier A-MAP IE existing in the form of the extended assignment A-MAP IE and an M2M ID corresponds to 16-bit in size.

TABLE 12

| Syntax | Size (bits) | Notes |
|---|---|---|
| A-MAP IE type | 4 | Extended Assignment A-MAP IE |
| Extended Assignment A-MAP IE type | 4 | Extended Assignment A-MAP IE |
| M2M_ID 1 | 16 | Identifies an M2M device belonging to an M2M group |
| M2M_ID 2 | 16 | Identifies an M2M device belonging to an M2M group If a value of this ID has a value of 0, this ID is ignored and only one (i.e. for a previous ID) unicast assignment A-MAP IE comes after this M2M identifier A-MAP IE. In particular, the unicast assignment A-MAP IE for this ID does not come after. |

Referring to Table 12, the M2M identifier A-MAP IE may correspond to an extended assignment A-MAP IE type. And, if an M2M ID corresponds to 16-bit in size, the M2M identifier A-MAP IE can include two M2M ID fields. In this case, the M2M identifier A-MAP IE exists without a reserved bit. If a second M2M ID (M2M_ID 2) has a value of 0, the value of the M2M_ID 2 can be ignored.

Meanwhile, if an M2M ID corresponds to 8-bit in size, the M2M identifier A-Map IE can include four M2M ID fields. A following Table 13 indicates an example of the M2M identifier A-MAP IE message format in case that an M2M ID corresponds to 8-bit in size.

TABLE 13

| Syntax | Size (bits) | Notes |
|---|---|---|
| A-MAP IE type | 4 | Extended Assignment A-MAP IE |
| Extended Assignment A-MAP IE type | 4 | Extended Assignment A-MAP IE |
| M2M_ID 1 | 8 | Identifies an M2M device belonging to an M2M group |
| M2M_ID 2 | 8 | Identifies an M2M device belonging to an M2M group If a value of this ID has a value of 0, this ID is ignored and only one (i.e. for a previous ID) unicast assignment A-MAP IE comes after this M2M identifier A-MAP IE. In particular, the unicast assignment A-MAP IE for this ID does not come after. |
| M2M_ID 3 | 8 | Identifies an M2M device belonging to an M2M group If a value of this ID has a value of 0, this ID is ignored and only one (i.e. for a previous ID) unicast assignment A-MAP IE comes after this M2M |

TABLE 13-continued

| Syntax | Size (bits) | Notes |
|---|---|---|
| | | identifier A-MAP IE. In particular, the unicast assignment A-MAP IE for this ID does not come after. |
| M2M_ID 4 | 8 | Identifies an M2M device belonging to an M2M group<br>If a value of this ID has a value of 0, this ID is ignored and only one (i.e. for a previous ID) unicast assignment A-MAP IE comes after this M2M identifier A-MAP IE. In particular, the unicast assignment A-MAP IE for this ID does not come after. |

Referring to Table 13, an M2M identifier A-MAP IE message can include four M2M ID fields in case that an M2M ID corresponds to 8-bit in size. If a value of the rest of the M2M IDs except a first M2M ID (M2M_ID 1) corresponds to 0, a corresponding M2M ID can be ignored.

Meanwhile, if an M2M ID corresponds to 9-bit or 10-bit in size, the M2M identifier A-MAP IE message can include three M2M ID fields. If the M2M ID corresponds to 11~16-bit in size, the M2M identifier A-MAP IE message can include two M2M ID fields and if the M2M ID equals to 17-bit in size or greater than 17-bit in size, the M2M identifier A-MAP IE message can include one M2M ID.

As mentioned in the foregoing description, an M2M ID can be transmitted via a newly defined M2M identifier A-MAP IE message according to various embodiments of the present invention. And, resource allocation information for M2M IDs can be transmitted to M2M devices via a separate A-MAP IE (e.g., a unicast assignment A-MAP IE). In particular, a base station transmits the M2M identifier A-MAP IE to the M2M devices in a manner of including a plurality of M2M IDs in the M2M identifier A-MAP IE and transmits the resource allocation information for a plurality of the M2M IDs via a unicast assignment A-MAP IE, thereby considerably reducing control information transmission overhead.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

Accordingly, a method of transmitting/receiving control information for an M2M device and an apparatus therefor are industrially available for various communication systems including 3GPP LTE, LTE-A, IEEE 802, and the like.

What is claimed is:

1. A method of transmitting control information for a machine to machine (M2M) device by a base station in a wireless communication system, the method comprising:
configuring a first message including at least one M2M identifier (II)) field and at least one second message including resource allocation information corresponding to the at least one M2M ID; and
transmitting the first message and the at least one second message to the at least one M2M device,
wherein the first and the second message have a format different from each other,
wherein a number of M2M ID fields included in the first message are determined based on size of a M2M ID field,
wherein a plurality of M2M ID fields in the first message are arranged in ascending order if the first message includes two or more M2M ID fields, and
wherein a second message corresponding to a first M2M ID field is not transmitted if the first M2M ID field has a specific value.

2. The method of claim 1, wherein if the first message includes two or more M2M ID fields, the second message is transmitted to each of M2M devices corresponding to a plurality of the M2M ID fields.

3. The method of claim 1, wherein the first message corresponds to an M2M identifier A-MAP IE message.

4. The method of claim 1, wherein the second message corresponds to a unicast assignment A-MAP IE message.

5. A base station for transmitting control information for a machine to machine (M2M) device in a wireless communication system, the base station comprising:
a RF (Radio Frequency) module; and
a processor configured to control the RF module,
wherein the processor is configured to configure a first message including at least one M2M identifier (ID) field and at least one second message including resource allocation information corresponding to the at least one M2M ID, and to transmit the first message and the at least one second message to the at least one M2M device,
wherein the first and the second message have a format different from each other,
wherein a number of M2M ID fields included in the first message are determined based on size of a M2M ID field,
wherein a plurality of M2M ID fields in the first message are arranged in ascending order if the first message includes two or more M2M ID fields, and
wherein a second message corresponding to a first M2M ID field is not transmitted if the first M2M ID field has a specific value.

6. The base station of claim 5, wherein if the first message includes two or more M2M ID fields, the second message is transmitted to each of M2M devices corresponding to a plurality of the M2M ID fields.

7. The base station of claim 5, wherein the first message corresponds to an M2M identifier A-MAP IE message.

8. The base station of claim 5, wherein the second message corresponds to a unicast assignment A-MAP IE message.

* * * * *